(12) United States Patent
Wolgast

(10) Patent No.: US 9,326,461 B2
(45) Date of Patent: May 3, 2016

(54) SYSTEM AND METHOD FOR IRRIGATION MANAGEMENT

(71) Applicant: Lindsay Corporation, Omaha, NE (US)

(72) Inventor: Cory Wolgast, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 124 days.

(21) Appl. No.: 13/803,223

(22) Filed: Mar. 14, 2013

(65) Prior Publication Data

US 2014/0263706 A1  Sep. 18, 2014

(51) Int. Cl.
*B05B 3/00* (2006.01)
*A01G 25/09* (2006.01)

(52) U.S. Cl.
CPC ..................... *A01G 25/092* (2013.01)

(58) Field of Classification Search
None
See application file for complete search history.

(56) References Cited

U.S. PATENT DOCUMENTS

| 4,877,189 | A * | 10/1989 | Williams | 239/749 |
|---|---|---|---|---|
| 6,267,298 | B1 * | 7/2001 | Campbell | 239/70 |
| 6,431,475 | B1 * | 8/2002 | Williams | 239/750 |
| 6,568,416 | B2 * | 5/2003 | Tucker et al. | 137/14 |
| 7,584,053 | B2 * | 9/2009 | Abts | 701/485 |
| 2002/0002425 | A1 * | 1/2002 | Dossey et al. | 700/284 |
| 2002/0066810 | A1 * | 6/2002 | Prandi | 239/728 |
| 2002/0117214 | A1 * | 8/2002 | Tucker et al. | 137/487.5 |
| 2005/0156068 | A1 * | 7/2005 | Ivans | 239/723 |
| 2006/0027677 | A1 * | 2/2006 | Abts | 239/67 |

* cited by examiner

*Primary Examiner* — Len Tran
*Assistant Examiner* — Adam J Rogers
(74) *Attorney, Agent, or Firm* — Hovey Williams LLP

(57) ABSTRACT

An irrigation management system includes a water pump, at least one mobile irrigation system, and a pump controller. The mobile irrigation system includes a water pressure sensor for generating water pressure data indicating water pressure in the irrigation system. The pump controller is configured to receive the water pressure data generated by the water pressure sensor, to compare a target water pressure with the sensed water pressure data to determine a difference between the target water pressure and the sensed water pressure, and to adjust operation of the water pump to increase or decrease water pressure to the irrigation system in a manner that resolves the difference between the target water pressure and the sensed water pressure.

12 Claims, 2 Drawing Sheets

SYSTEM AND METHOD FOR IRRIGATION MANAGEMENT

BACKGROUND

1. Field

Embodiments of the present invention relate to irrigation management systems. More particularly, embodiments of the present invention relate to irrigation management systems configured to automatically adapt to changes in water demand from irrigation distribution systems.

2. Related Art

Mobile irrigation systems such as pivot-type irrigation systems and lateral-move irrigation systems are connected to water pumps that pump water to the irrigation systems from a water source, such as a pond, river or aquifer. Such water pumps typically provide water to multiple irrigation systems simultaneously and may be located remotely from the irrigation systems. Each irrigation system operates at an optimum water pressure that depends on such factors as the type of crop, the number of sections in the irrigation system, and the number and type of sprinkler heads on the irrigation system.

Each water pump that supplies water to the irrigation systems can be adjusted to supply water at various output levels to meet the needs of the system or systems it supplies. A pump providing water to multiple irrigation systems, for example, typically needs to operate at a greater output level than a pump providing water to a single irrigation system. Pumps are adjusted by manually actuating valves or other control features at the pump station. The optimum water pressure for each irrigation system may change during use, such as where the angle or direction of incline of the irrigation system changes at is travels along the irrigated terrain. Additionally, the total demand for water may fluctuate, such as where one or more irrigation systems may begin or end operation during the normal course of use. In any of these situations, the water pressure at each irrigation system may deviate from the optimum water pressure and have a negative effect on the performance of the irrigation system.

SUMMARY

Embodiments of the present invention solve the above-described problems by providing an irrigation management system operable to monitor the water pressure in each of a plurality of irrigation systems and automatically adjust the production of a water pump associated with the irrigation systems to address fluctuations in the water pressure.

An irrigation management system in accordance with an embodiment of the invention comprises a mobile irrigation system, a water pump and a controller. The mobile irrigation system receives water from the water pump and disperses the water, and includes a water pressure sensor for generating water pressure data indicating water pressure in the irrigation system.

The controller is configured to receive the water pressure data generated by the water pressure sensor and to compare a target water pressure with the sensed water pressure data to determine a difference between the target water pressure and the sensed water pressure. The controller adjusts operation of the water pump to increase or decrease water pressure to the irrigation system in a manner that resolves the difference between the target water pressure and the sensed water pressure.

A method of managing an irrigation system in accordance with another embodiment of the invention comprises receiving water pressure data from each of a plurality of water pressure sensors, wherein each of the water pressure sensors is associated with a separate mobile irrigation system. For each of the mobile irrigation systems, a target water pressure associated with the irrigation system is compared with the water pressure data from the irrigation system to determine a difference between the target water pressure and the sensed water pressure.

The method further comprises determining if any of the irrigation systems has a negative water pressure deviation. A negative water pressure deviation occurs when the sensed water pressure of an irrigation system is less than the target water pressure for that system. If any of the irrigation systems has a negative pressure deviation in excess of a predetermined amount, an irrigation system with the greatest negative deviation is identified and operation of the pump is adjusted to increase water pressure to all of the plurality of irrigation systems in a manner that resolves the greatest negative deviation.

An irrigation management system in accordance with yet another embodiment of the invention comprises a pump station and a plurality of irrigation systems for receiving water from the pump station and dispersing the water. The pump station includes a water pump and a pump controller. The pump controller is configured to compare a target water pressure associated with each irrigation system with water pressure data from a water pressure sensor associated with the irrigation system to determine a difference between the target water pressure and the sensed water pressure and determines if any of the irrigation systems has a negative water pressure deviation. A negative water pressure deviation occurs when the sensed water pressure of an irrigation system is less than the target water pressure for that system.

If any of the irrigation systems has a negative water pressure deviation in excess of a predetermined amount, the pump controller identifies an irrigation system with the greatest negative water pressure deviation and adjusts operation of the pump to increase water pressure to the plurality of irrigation systems in a manner that resolves the greatest negative water pressure deviation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Figure 1:
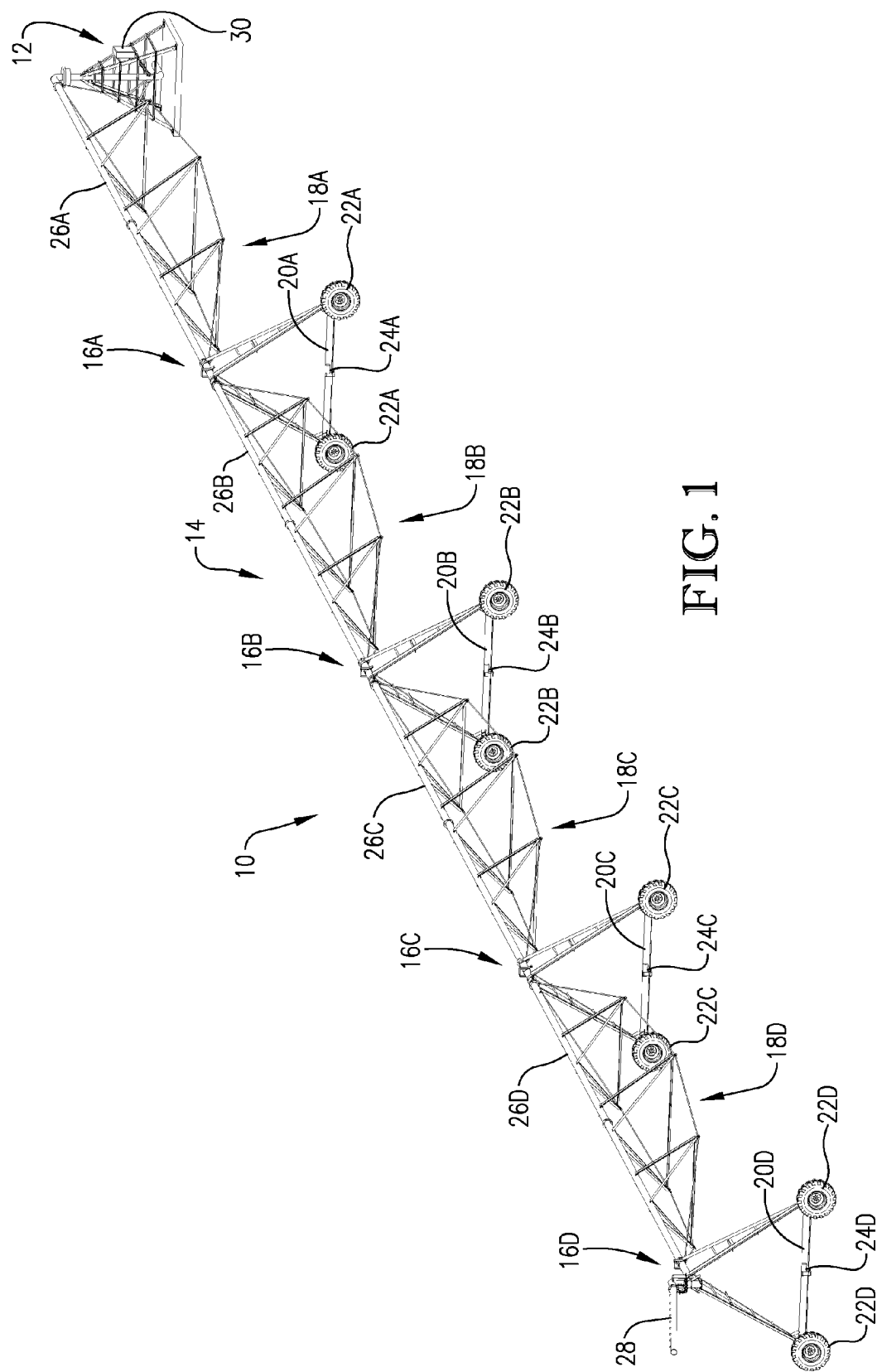
FIG. 1 is a perspective view of an exemplary pivot type irrigation system for use with an irrigation management system constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
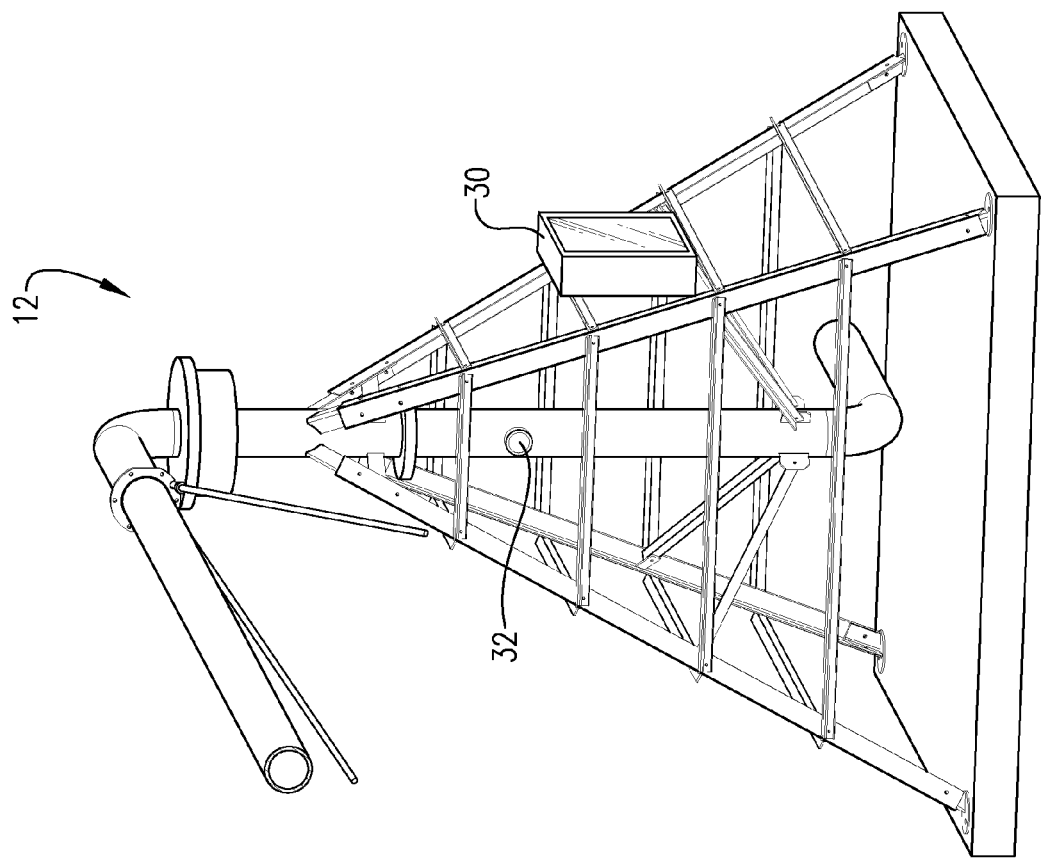
FIG. 2 is a perspective view of a fixed central pivot of the irrigation system of FIG. 1.

Turning now to the drawing figures, and initially FIGS. 1 and 2, an exemplary irrigation system 10 is illustrated that may be used in accordance with embodiments of the invention. The illustrated irrigation system 10 is a central pivot irrigation system that broadly comprises a fixed central pivot 12 and a main section 14 pivotally connected to the central pivot 12. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot 12 has access to a well, water tank, or other source of water and may also be coupled with a tank or other source of agricultural products to inject fertilizers, pesticides and/or other chemicals into the water for application during irrigation.

The main section 14 may comprise a number of mobile support towers 16A-D, the outermost 16D of which is referred to herein as an "end tower". The support towers are connected to the fixed central pivot 12 and to one another by truss sections 18A-D or other supports to form a number of interconnected spans. The irrigation system 10 illustrated in FIG. 1 includes four mobile support towers 16A-D; however, it may comprise any number of mobile support towers without departing from the scope of the present invention.

Each mobile tower may include a drive tube 20A-D on which a pair of wheel assemblies 22A-D is mounted. A drive motor 24A-D is mounted to each drive tube 20A-D for driving the wheel assemblies 22A-D. The motors 24A-D may include integral or external relays so they may be turned on, off, and reversed. The motors may also have several speeds or be equipped with variable speed drives.

Each of the truss sections 18A-D carries or otherwise supports a conduit section 26A-D or other fluid distribution mechanism that is connected in fluid communication with all other conduit sections. A plurality of sprinkler heads, spray guns, drop nozzles, or other fluid-emitting devices are spaced along the conduit sections 26A-D to apply water and/or other fluids to an area beneath the irrigation system.

The irrigation system 10 may also include an optional extension arm (not shown) pivotally connected to the end tower 16D and supported by a swing tower with steerable wheels driven by a motor. The extension arm may be joined to the end tower by an articulating pivot joint. The extension arm is folded inward relative to the end tower when it is not irrigating a corner of a field and may be pivoted outwardly away from the end tower while irrigating the corners of a field.

The irrigation system 10 may also include one or more high pressure sprayers or end guns 28 mounted to the end tower 16D or to the end of the extension arm. The end guns 28 may be activated at the corners of a field or other designated areas to increase the amount of land that can be irrigated.

The irrigation system 10 includes a system controller 30 and a water pressure sensor 32 in communication with the system controller 30. The system controller 30 is preferably mounted on the tower 12 to provide easy user access. The system controller 30 includes a computing component and other components for use with the computing component, including power components such as batteries, user interface components, and communications components for communicating with the drive motors 24A-D and/or remote communications equipment, such as a cellular phone network or other wireless network. The system controller 30 may be encased in a waterproof housing or otherwise sealed from the environment to protect electrical components that may be damaged by water, dust or sunlight.

The water pressure sensor 32 is configured to measure the pressure of water in the irrigation system 10 and to communicate water pressure information to the controller 30. The water pressure sensor 32 may include a pressure transducer that extends through a wall of a pipe section or conduit on which it is mounted and is exposed to the water inside the pipe section. The sensor 32 may include one or more wires (not illustrated) electrically connecting the sensor 32 and the controller 30 and configured to transfer the water pressure information from the sensor 32 to the controller 30. Alternatively, the sensor 32 and the controller 30 may be configured to communicate wirelessly. It will be appreciated by those skilled in the art that various methods and means may be used to measure the water pressure and communicate the water pressure information from the sensor 32 to the controller 30 without departing from the spirit or scope of the present invention.

Figure 3:
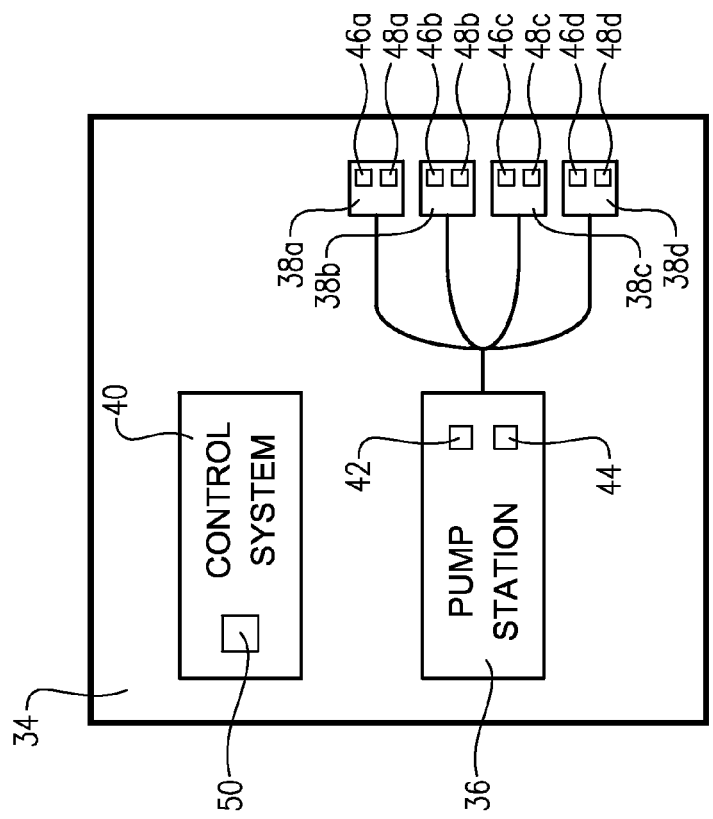
FIG. 3 is a block diagram of an irrigation management system constructed in accordance with embodiments of the invention.

An irrigation management system 34 embodying principles of the present invention is illustrated in FIG. 3. The irrigation management system 34 includes a pump station 36, a plurality of irrigation systems 38 associated with the pump station 36, and a control system 40 for managing operation of the pump station 36 and the irrigation systems 38.

The pump station 36 pumps water from a water source (not shown) to the plurality of irrigation systems 38 via a system of water conduits, such as underground pipes. The pump station 36 may be located proximate the water source, such as a pond, river or aquifer and may be conventional in nature. The pump station 36 includes one or more water pumps 42 and may include a pump station controller 44 for controlling the one or more water pumps 42. Among other things, the pump station controller 44 monitors water production and adjusts operation of the one or more pumps 44 so that the water production matches a predetermined level or "setpoint." By way of example, the pump station water production may be set to a predetermined output water pressure wherein the controller 44 monitors the output water pressure and adjusts operation of the one or more pumps 42 in response to fluctuations in the water pressure.

Each of the irrigation systems 38a-d may be similar to the irrigation system 10 described above, and each may include an irrigation system controller 46a-d and a water pressure sensor 48a-d that may be similar or identical to the controller 30 and sensor 32 described above in both form and function. The irrigation system controllers 46 may process the water pressure data, communicate the water pressure data to the control system 40, or both. By way of example, each irrigation system controller 46 may determine whether the water pressure at the respective irrigation system has deviated from a target water pressure by a predetermined amount and, if so, communicate the water pressure information to the control system 40.

The number of irrigation systems 38 associated with the pump station 36 may vary from one embodiment of the invention to another. In some embodiments, a single irrigation system 38 may be associated with the pump station 36. In other embodiments, multiple irrigation systems 38 may be associated with the pump station 36. Furthermore, the number of operating irrigation systems 38 associated with a single pump station 36 may change over time as new irrigation systems are assembled and connected to the pump station 36, as existing irrigation systems are removed, and as existing irrigation systems begin operations and end operations during the normal course of use. Irrigation systems 38 may begin or end operations for various reasons, including for scheduled starts and stops or for repairs or maintenance. The irrigation systems 38 may be located relatively close to the pump station 36, such as within several hundred feet or less, or may be located a relatively large distance from the pump station 36, such as a mile or more.

Each of the irrigation systems 38 has a target operating water pressure associated with it. The target water pressure is the preferred or ideal water pressure associated with that particular system 38 and depends on various factors, including manufacturer recommendations, the overall size and distribution capacity of the system 38, the speed at which the irrigation system 38 travels, the crop being irrigated by the system 38, and the nature of the sprinkler heads. The target water pressure for each irrigation system 38 is preferably submitted to the control system 40 by a user, and may be submitted via the control system user interface 50, via the irrigation system controllers 46, or both. The control system 40 stores the target water pressure associated with each irrigation system 38 for use in managing the output of the pump station 36, as explained below in greater detail. The target water pressure may be stored in each irrigation system controller 46, remotely in the control system 40, or both.

The control system 40 includes one or more computers or controllers in communication with the pump station controller 44 and with each of the irrigation system controllers 46. The control system computers may be located remotely from the pump station 36 and the irrigation systems 38 and may manage more than one pump station 36 and associated irrigation systems 38. The control system computers may be in communication with the pump station controller 44 and the irrigation system controllers 46 via a cellular wireless network or other wireless technology.

The control system 40 is operable to automatically adjust operation of the pump station 36 such that the irrigation systems 38 operate at or near their target water pressure. As explained above, the pump station water production is regulated by the pump station controller 44 such that the pump station production matches a predetermined setpoint. Due to variables in the operation of the various irrigation systems 38*a-d*, however, the setpoint may need to be adjusted during operation to ensure that the irrigation systems 38*a-d* operate at or near the target water pressure. Such operational variables may include changes in the position of each irrigation system including whether it is on relatively level terrain or is on inclined terrain, the addition of a new irrigation system, and existing systems beginning and ending irrigation operations. As the various irrigation systems 38*a-d* go through these changes, all of the irrigation systems 38*a-d* may be affected such that the pressure in each system may fluctuate. It may be necessary to adjust the pump station production to respond to these fluctuations.

The control system 40 may manage operation of the pump station 36 when the pump station 36 is supplying water to a single irrigation system or when the pump station 36 is supplying water to multiple irrigation systems. The number of irrigation systems 38 supplied by the pump station 36 may change during use as some of the irrigation systems 38 begin irrigation runs and others end irrigation runs during the normal course of operation. In the exemplary system illustrated in FIG. 3, the pump station 36 is associated with four irrigation systems 38*a-d*. During the course of use, all of the irrigation systems 38*a-d* may be in operation simultaneously or any subset of the four may be operating. If three of the four irrigation systems 38*a-d* are between programmed irrigation runs and not operating, for example, the pump station 36 may be supplying water to only one irrigation system. The control system 40 may manage operation of the pump station 36 differently if the pump station 36 is supplying a single irrigation system versus if the pump station is supplying multiple irrigation systems 38*a-d*.

If the pump station 36 is supplying a single irrigation system 38, it may operate as follows. The irrigation system water pressure sensor 48 monitors the water pressure in the irrigation system 38 and communicates the water pressure value to the irrigation system controller 46. The irrigation system controller 46 communicates the water pressure to the control system 40, which compares the actual water pressure measured by the sensor 48 with the target water pressure associated with the irrigation system 38 to determine if there is a difference or deviation between the actual water pressure and the target water pressure. A water pressure deviation may result from the actual water pressure being either greater than (a positive deviation) or less than (a negative deviation) the target water pressure.

If the control system 40 determines that there is a water pressure deviation, the control system 40 causes the pump station 36 to adjust operations to resolve the deviation. This may involve, for example, the control system 40 communicating the water pressure difference to the pump station controller 44 which in turn actuates the pump 42 to increase or decrease water production so that the actual water pressure measured at the irrigation system 38 is equal to or approximately equal to the target water pressure associated with the irrigation system 38.

The control system 40 and/or the pump station 36 may resolve the water pressure deviation if any difference is detected, or may resolve the deviation only when the difference exceeds a predetermined amount or threshold. The predetermined amount or threshold may be between one percent and ten percent of the target pressure, more preferably between two percent and five percent of the target pressure. In terms of actual water pressure, the predetermined amount may be between 0.5 psi and 20 psi, more preferably between 2 psi and 10 psi.

Additionally, the control system 40 and/or the pump station 36 may resolve the deviation differently according to whether the deviation is positive or negative. The control system 40 and/or the pump station 36 may resolve any negative deviation regardless of magnitude, for example, but may only resolve a positive deviation that exceeds a predetermined threshold, as explained above. Similarly, the control system 40 and/or the pump station 36 may resolve negative deviations that exceed a small threshold and resolve positive deviations that exceed a large threshold, or vice versa.

If the pump station 36 is supplying water to more than one irrigation system 38 the process may be different, with the focus on ensuring all of the irrigation systems 38 in operation are operating at or above their respective target water pressures. The water pressure sensors 48a-d associated with each of the operating irrigation systems 38a-d generates water pressure data and communicates the water pressure data to the respective irrigation system controller 46a-d, which then communicates the actual water pressure to the control system 40. The control system 40 compares the water pressure data received from each irrigation system 38 with the target water pressure associate with the respective irrigation system 38. If one or more of the irrigation systems 38a-d is not operating, the controller 46 associated with the non-operating irrigation systems does not communicate water pressure data to the control system 40, and the control system 40 does not include an actual water pressure or a target water pressure associated with the non-operating irrigation systems in its calculations.

The control system 40 first determines if a negative deviation (an actual water pressure that is less than the target water pressure) exists at one or more of the operating irrigation systems 38. If the control system 40 determines that one or more of the irrigation systems 38 is operating at a negative water pressure deviation, it determines which of the systems 38 is operating at the greatest negative water pressure deviation. The control system 40 then adjusts operation of the pump station 36 to resolve the greatest negative deviation by increasing water production of the pump station 36. The increased production increases pressure in all of the irrigation systems 38 until the greatest negative deviation is resolved. This may result in one or more of the irrigation systems 38 operating at a water pressure that is greater than the target water pressure (i.e., a "positive deviation"). Operating some of the irrigation systems 38 at a positive deviation is generally preferable to operating some of the irrigation systems 38 at a negative deviation because overwatering is typically less harmful to crop production than underwatering.

If the control system 40 determines that none of the irrigation systems 38 is operating at a negative water pressure deviation, it then determines whether the irrigation systems 38 are operating at a positive water pressure deviation. If so, the control system 40 adjusts operation of the pump station 36 to resolve the positive water pressure deviation without causing any of the irrigation systems 38 to operate at a negative water pressure deviation. To do this, the control system 40 determines which of the irrigation systems 38 is operating at the smallest positive water pressure deviation and adjusts operation of the pump station 36 to resolve the smallest positive water pressure deviation. Resolving the smallest water pressure deviation results in decreased water pressure at all of the irrigation systems 38 without resulting in any negative water pressure deviation.

As used herein, "resolving" a water pressure deviation means adjusting operation of the pump station 36 such that the water pressure deviation is less than a pre-determined amount. The control system 40, the controller 44, or both may be configured to resolve water pressure deviations in a pre-determined period of time, such as within twenty minutes, fifteen minutes, ten minutes, five minutes or one minute. The control system 40 and/or the controller 44 may accomplish this by, for example, comparing the deviation to the pre-determined period of time to determine a rate at which the output should be adjusted upward or downwards. If the control system 40 identifies a positive deviation of five psi, for example, and the pre-determined period of time is five minutes, the control system 40 may command the controller 44 to adjust the water production downward at a rate of one psi per minute. Similarly, if the control system 40 identifies a negative deviation of five psi and the pre-determined period of time is ten minutes, the control system 40 may instruct the controller 44 to adjust the water production upward at a rate of one-half psi per minute. The rate may be determined by either the controls system 40 or the controller 36.

The control system 40 is configured to operate the pump station 36 within the bounds of a maximum setpoint and a minimum setpoint to prevent runaway pressure changes. By way of example, if one of the irrigation systems 38 becomes ruptured and is unable to maintain water pressure, the control system 40 may detect the loss in pressure and attempt to compensate for the lost pressure by increasing water production at the pump station 36. A maximum setpoint would allow the production of the pump station 36 to increase only to a predetermined threshold. Upon reaching the setpoint the control system 40 may cause production to remain constant or may shut down the pump station 36 and alert a user that there is a malfunction.

Although the invention has been described with reference to the exemplary embodiments illustrated in the attached drawings, it is noted that equivalents may be employed and substitutions made herein without departing from the scope of the invention as recited in the claims. For example, the water pressure sensor 32 may be mounted at any of various locations on the irrigation system 10, including at or near the central pivot 12 (as illustrated) or on any of the various sections of the irrigation system 10. Furthermore, the functionality of the irrigation system controller 30, the pump station controller 44, or both may be implemented remotely from the irrigation system 10 and the pump station 36, such as in the control system 40.

Having thus described various embodiments of the invention, what is claimed as new and desired to be protected by Letters Patent includes the following:

1. An irrigation management system for controlling one or more water pumps supplying water to a plurality of mobile irrigation systems, the irrigation management system comprising:
   a controller configured to:
      receive water pressure data from each of the mobile irrigation systems;
      compare the water pressure data from each of the mobile irrigation systems with a target water pressure to determine differences between the water pressure data from each of the mobile irrigation systems and the target water pressure;
      determine whether the differences indicate that water pressure of at least one of the mobile irrigation systems is lower than the target water pressure;
      if the differences indicate that water pressure of at least one of the mobile irrigation systems is lower than the target water pressure, determine which of the differences indicates a greatest deviation below the target water pressure; and
      adjust operation of the one or more water pumps to increase water pressure to the irrigation systems in a manner that resolves the difference indicating the greatest deviation below the target water pressure.

2. The irrigation management system of claim 1, the controller configured to adjust operation of the one or more water pumps only when the difference indicating the greatest deviation below the target water pressure is greater than a predetermined amount.

3. The irrigation management system of claim 2, the predetermined amount being between two percent and ten percent of the target water pressure.

4. The irrigation management system of claim 2, the predetermined amount being between 1 psi and 10 psi.

5. The irrigation management system of claim 1, the controller configured to adjust operation of the one or more water pumps to increase water pressure to the irrigation systems such that the difference indicating the greatest deviation below the target water pressure is resolved in a predetermined amount of time.

6. The irrigation management system of claim 5, the predetermined amount of time being between one minute and five minutes.

7. The irrigation management system of claim 1, the controller configured to adjust operation of the one or more water pumps within bounds of a maximum setpoint and a minimum setpoint.

8. The irrigation management system of claim 1, the controller being implemented by a computer located remotely from the one or more water pumps and from the mobile irrigation systems.

9. An irrigation management system for controlling one or more water pumps supplying water to a plurality of mobile irrigation systems, the irrigation management system comprising:
 a controller configured to:
  receive water pressure data from each of the mobile irrigation systems;
  compare the water pressure data from each of the mobile irrigation systems with a target water pressure to determine differences between the water pressure data from each of the mobile irrigation systems and the target water pressure;
  determine whether the differences indicate that water pressure of at least one of the mobile irrigation systems is lower than the target water pressure;
  if the differences indicate that water pressure of at least one of the mobile irrigation systems is lower than the target water pressure, determine which of the differences indicates a greatest deviation below the target water pressure;
  adjust operation of the one or more water pumps to increase water pressure to the irrigation systems in a manner that resolves the difference indicating the greatest deviation below the target water pressure;
  if the differences do not indicate that water pressure of at least one of the mobile irrigation systems is lower than the target water pressure, determine whether the differences indicate that water pressure of each of the mobile irrigation systems is higher than the target water pressure;
  if the differences indicate that water pressure of each of the mobile irrigation systems is higher than the target water pressure, determine which of the differences indicates a smallest deviation above the target water pressure; and
  adjust operation of the one or more water pumps to decrease water pressure to the irrigation systems in a manner that resolves the difference indicating the smallest deviation above the target water pressure.

10. The irrigation management system of claim 9, the controller configured to, after determining which of the differences indicates the smallest deviation above the target water pressure, determine whether the difference indicating the smallest deviation above the target water pressure is greater than a predetermined threshold, and to adjust operation of the one or more water pumps only if the difference indicating the smallest deviation above the target water pressure is greater than the predetermined threshold.

11. The irrigation management system of claim 9, the controller configured to, after determining which of the differences indicates the greatest deviation below the target water pressure, determine whether the difference indicating the greatest deviation below the target water pressure is greater than a first predetermined threshold, and to adjust operation of the one or more water pumps only if the difference indicating the greatest deviation below the target water pressure is greater than the first predetermined threshold.

12. The irrigation management system of claim 11, the controller configured to, after determining which of the differences indicates the smallest deviation above the target water pressure, determine whether the difference indicating the smallest deviation above the target water pressure is greater than a second predetermined threshold, and to adjust operation of the one or more water pumps only if the difference indicating the smallest deviation above the target water pressure is greater than the second predetermined threshold, the second predetermined threshold differentiating from the target threshold more the first predetermined threshold.

* * * * *